United States Patent
Hong

(10) Patent No.: US 9,825,537 B2
(45) Date of Patent: Nov. 21, 2017

(54) PULSE-WIDTH MODULATION (PWM) CONTROLLING APPARATUS USING AUXILIARY WINDING VOLTAGE FOR FLYBACK CONVERTER

(71) Applicant: Magnachip Semiconductor, Ltd., Cheongju-si (KR)

(72) Inventor: Seung Woo Hong, Seoul (KR)

(73) Assignee: Magnachip Semiconductor, Ltd., Cheongju-si (KR)

( * ) Notice: Subject to any disclaimer, the term of this patent is extended or adjusted under 35 U.S.C. 154(b) by 0 days.

(21) Appl. No.: 15/095,365

(22) Filed: Apr. 11, 2016

(65) Prior Publication Data

US 2016/0301317 A1    Oct. 13, 2016

(30) Foreign Application Priority Data

Apr. 13, 2015 (KR) .......................... 10-2015-0051804

(51) Int. Cl.
*H02M 3/335*  (2006.01)
*H02M 1/00*   (2006.01)

(52) U.S. Cl.
CPC ... *H02M 3/33507* (2013.01); *H02M 3/33523* (2013.01); *H02M 2001/0058* (2013.01); *Y02B 70/1491* (2013.01)

(58) Field of Classification Search
CPC ....................... H02M 3/33523; H02M 3/33507
See application file for complete search history.

(56) References Cited

U.S. PATENT DOCUMENTS

| | | | |
|---|---|---|---|
| 8,917,528 B2* | 12/2014 | Xu ......................... | H02M 3/335 363/21.12 |
| 2007/0103134 A1* | 5/2007 | Yang ................... | H02M 3/33523 323/282 |
| 2009/0091955 A1* | 4/2009 | Choi ................... | H02M 3/33507 363/37 |
| 2010/0140109 A1 | 6/2010 | Crawford et al. | |
| 2014/0029316 A1* | 1/2014 | Adragna ........... | H02M 3/33523 363/21.18 |

* cited by examiner

*Primary Examiner* — Timothy J Dole
*Assistant Examiner* — Ishrat Jamali
(74) *Attorney, Agent, or Firm* — NSIP Law

(57) ABSTRACT

A Pulse-Width Modulation (PWM) controlling apparatus includes a valley detector configured to detect a valley of an auxiliary winding voltage of a flyback converter, an output voltage controller configured to output a first PWM control signal by performing averaging and sampling of the auxiliary winding voltage, an output current controller configured to output a second PWM control signal by performing an average current mode method on a current signal (CS) voltage, a latch configured to output a gate control signal after being supplied with the result of a logical OR operation of the first PWM control signal output by the output voltage controller and the second PWM control signal output by the output current controller, or an output signal of the valley detector, and a gate controller configured to perform a turning-on or turning-off operation of a first switch based on the gate control signal.

20 Claims, 6 Drawing Sheets

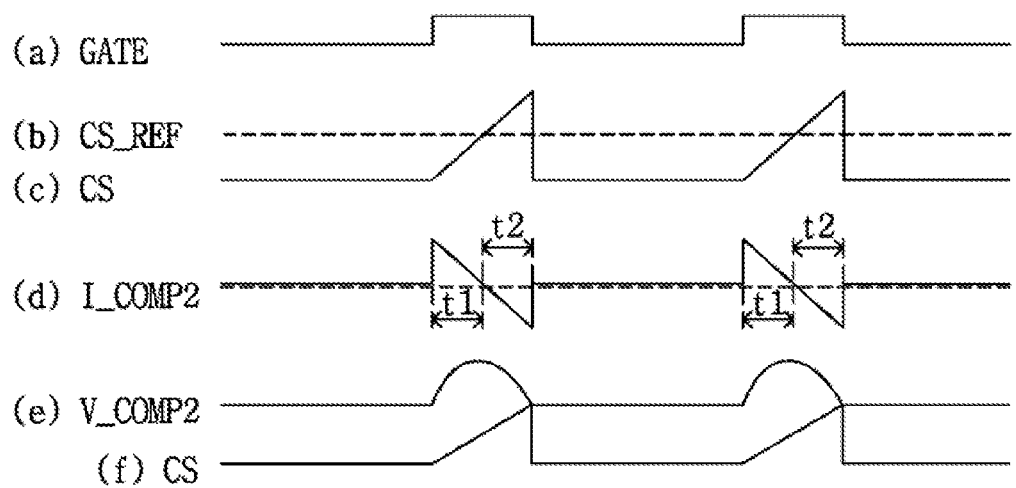

PULSE-WIDTH MODULATION (PWM) CONTROLLING APPARATUS USING AUXILIARY WINDING VOLTAGE FOR FLYBACK CONVERTER

CROSS-REFERENCE TO RELATED APPLICATION(S)

This application claims the benefit under 35 USC 119(a) of Korean Patent Application No. 10-2015-0051804 filed on Apr. 13, 2015 in the Korean Intellectual Property Office, the entire disclosure of which is incorporated herein by reference for all purposes.

BACKGROUND

1. Field

The following description relates to a PWM controlling apparatus, such as for a flyback converter. The following description also relates to a device that controls a flyback converter with an averaging/sampling method of an auxiliary winding voltage or an average current mode method.

2. Description of Related Art

Recently, use of portable electronic devices such as laptops, mobile phones, tablet PCs, and so on is increasing. The size of the portable electronic devices is tending to decrease, for improved portability. However, the functionality of the battery used to power the portable electronics is not improving as such scaling down occurs. Hence, the functionality of portable electronic devices is encountering issues and carrying an external power device is becoming required to supply power to such portable electronic devices because of increasing energy consumption requirements.

An adaptor using an isolated DC-DC converter, for example, a flyback converter, is mainly used as a power supply device of a portable electric device. A flyback converter is a buck-boost converter with the inductor split to form a transformer, so that the voltage ratios are multiplied with an additional advantage of isolation. For example, an application such as an adapter is controlled to have a constant current (CC) mode method and a constant voltage (CV) mode method. Further, a feedback signal is possibly received from a secondary-side to control the CC/CV control. The feedback signal generally uses an opto-coupler. For example, an opto-coupler uses light to transfer signals between otherwise isolated circuits. A primary side receives the secondary side information of the flyback converter through the opto-coupler and the controller controls an output voltage or an output current accordingly.

Likewise, the flyback converter receives a feedback signal from a secondary side that is an output terminal of the flyback converter for the CC/CV control operation. However, this structure has an issue of using a complicated secondary side circuit. In other words, in the example of the flyback converter, the primary side and the secondary side are insulated from one another by a transformer. Accordingly, circuits such as a secondary side circuit and an opto-coupler are required as aforementioned. Thus, the circuit structure accordingly becomes more complicated.

The primary side control method, referred to as Primary-Side Regulation (PSR), that controls the flyback converter to improve this situation has been suggested. The method controls a secondary side voltage or a current by indirectly obtaining the secondary information from the auxiliary winding voltage. Accordingly, a feedback circuit is not required to be formed, and thereby a lower cost, a smaller area and a higher efficiency become possible. However, because there is a requirement for secondary information to be transferred indirectly, a regulation feature in this method is further degraded than a regulation feature in the method that uses the opto-coupler. Further, in this approach, an issue of being influenced by a secondary side diode voltage drop is generated during constant voltage control. Therefore, in an application requiring an accurate regulation feature, a method controlled by forming a feedback circuit using an opto-coupler from the secondary-side is used.

However, recently, although the regulation feature is somewhat degraded, a primary side control method is preferred to obtain the advantages in terms of efficiency, area and cost.

As an example of the primary side control method, an output current is controlled using a peak current mode pulse-width modulation (PWM) method. However, in this example, operation failures may be generated or there may be limits to accurate control of operation due to an effect according to switching noise from a flyback converter.

Furthermore, an error exists between an auxiliary winding voltage and the output voltage due to a forward bias voltage of a diode when a current is applied to a secondary side diode. Further, when the primary switch is off, the current applied to the secondary side diode starts to decrease from a peak and becomes a zero current. The auxiliary winding voltage in this example generates a resonance phenomenon through an inductance of a primary side transformer and series parasitic inductances. Likewise, when a resonance phenomena is generated in the auxiliary winding voltage, the output voltage is not able to be controlled accurately. In other words, an output voltage of the flyback converter is proportional to the auxiliary winding voltage. Thus, a design of a timing and method of accurately sampling the auxiliary winding voltage is highly relevant to accurately control an output voltage.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a Pulse-Width Modulation (PWM) controlling apparatus includes a valley detector configured to detect a valley of an auxiliary winding voltage of a flyback converter, an output voltage controller configured to output a first PWM control signal by performing averaging and sampling of the auxiliary winding voltage, an output current controller configured to output a second PWM control signal by performing an average current mode method on a current signal (CS) voltage, a latch configured to output a gate control signal after being supplied with the result of a logical OR operation of the first PWM control signal output by the output voltage controller and the second PWM control signal output by the output current controller, or being supplied with an output signal of the valley detector, and a gate controller configured to perform a turning-on or turning-off operation of a first switch based on the gate control signal.

The output voltage controller may include a constant voltage controller configured to generate a first control voltage based on the auxiliary winding voltage and an auxiliary winding reference voltage, and a first PWM comparator configured to output the first PWM control signal to determine a first switch gate duty cycle by comparing a generated sawtooth wave, that is generated in an internal Integrated Circuit (IC), with the PWM control voltage.

The constant voltage controller may include a first detector configured to detect a time at which a current applied to a secondary side diode of the constant voltage controller becomes zero, a second detector, connected to an output terminal of the first detector, configured to detect a time for detecting the auxiliary winding voltage, a sampling signal generator configured to generate a signal for sampling at a time that is earlier than the time detected by the first detector based on the time detected by the second detector, a non-overlapping clock signal generator configured to generate a clock signal that does not overlap with a sampling signal of the sampling signal generator, an averaging sampler configured to perform sampling to produce a sampling signal by averaging the auxiliary winding voltage using the signal generated by the sampling signal generator and the clock signal generated by the non-overlapping clock signal generator, and a first error amplifier configured to output the first control voltage by comparing the sampling signal and the auxiliary winding voltage reference value.

The output terminal of the first error amplifier may further include a frequency compensator.

The sampling signal generator may be configured to perform sampling of the auxiliary winding voltage before a resonance is generated by the auxiliary winding voltage.

The output current controller may include a constant current controller configured to receive the CS voltage and a CS reference voltage and to generate a second control voltage, and a second PWM comparator configured to compare the second control voltage and the CS voltage to output a second PWM control signal.

The constant current controller may include a second error amplifier configured to compare the CS voltage and the CS reference voltage, a second switch configured to operate in accordance with a switching of the first switch and to determine a route for transferring the output current of the second error amplifier, and a pull-up current source that is connected to a first side of the second switch.

The second PWM comparator may include a first terminal that is supplied with the CS voltage, and a second terminal that is supplied with an output voltage of the constant current controller.

The second terminal of the second PWM comparator may be further connected with the frequency compensator configured to compensate for an output current of the second error amplifier, and the frequency compensator may include a compensation capacitor configured to charge and discharge based on an output current of the second error amplifier.

In response to the CS voltage being smaller than the CS reference voltage, the compensation capacitor may be charged while the first switch is turned-on.

In response to the CS voltage being larger than the CS reference voltage, the compensation capacitor may be discharged while the first switch is turned-on.

The discharging time may become longer than the charging time in response to the turning-on time of the first switch lengthening.

In response to the gate duty of the first switch becoming larger, an average current of the second error amplifier may increase.

In response to the gate duty of the first switch becoming smaller, an average current of the second error amplifier may decrease.

In response to the gate duty of the first switch being consistent, the output voltage of the constant current controller may be consistent and the PWM controlling apparatus may operate in an average current mode.

In another general aspect, a Pulse-Width Modulation (PWM) controlling apparatus includes an output voltage controller configured to output a first PWM control signal by performing averaging and sampling of an auxiliary winding voltage of a flyback converter, an output current controller configured to output a second PWM control signal by performing an average current mode method on a current signal (CS) voltage, and a gate controller configured to perform a turning-on or turning-off operation of a first switch based on the first PWM control signal, the second PWM control signal, and a valley of the auxiliary winding voltage of the flyback converter.

The PWM controlling apparatus may further include a valley detector configured to detect a valley of the auxiliary winding voltage of the flyback converter.

The gate controller may be configured to perform the turning-on or turning-off operation of the first switch based on a gate control signal output by a latch configured to output the gate control signal after being supplied with the result of a logical OR operation of the first PWM control signal output by the output voltage controller and the second PWM control signal output by the output current controller, or being supplied with an output signal of the valley detector.

The output voltage controller may include a constant voltage controller configured to generate a first control voltage based on the auxiliary winding voltage and an auxiliary winding reference voltage, and a first PWM comparator configured to output the first PWM control signal to determine a first switch gate duty cycle by comparing a generated sawtooth wave, that is generated in an internal Integrated Circuit (IC), with the PWM control voltage.

The output current controller may include a constant current controller configured to receive a CS voltage and a CS reference voltage and to generate a second control voltage, and a second PWM comparator configured to compare the second PWM control voltage and the CS voltage to output a second PWM control signal.

Other features and aspects will be apparent from the following detailed description, the drawings, and the claims.

BRIEF DESCRIPTION OF THE DRAWINGS

FIG. 6 to FIG. 8 are a timing diagrams controlling an output current with an average current mode method through different gate duties of a flyback converter according to an embodiment.

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

A PWM control device of a flyback converter according to an embodiment has the following effects.

For example, the following description relates to a PWM control device of a flyback converter that minimizes the effects of a noise with respect to a sampling voltage, because an auxiliary winding voltage formed on a primary side of a flyback converter is sampled through averaging. Accordingly, a possibility of faulty operation of the flyback converter is reduced and an output voltage is controlled more accurately.

Further, the present embodiments control the output current using an average current mode method. This is approach is more resistant to noise than an approach of generating the output current with a peak current mode of an alternative technology. Accordingly, the output current is controlled more accurately.

Thus, the functionality of the flyback converter is further improved by more accurately controlling the output voltage and the output current.

Thus, the present description relates to a flyback converter that is formed to have a primary side control method in which an auxiliary winding voltage is applied using an averaging/sampling method, and accordingly an output voltage is suitably controlled. Further, operation functionality of such a flyback converter is improved by controlling an output current using an average current mode method.

Subsequently, the following description discusses an embodiment of a PWM controller of a flyback converter according to an embodiment, referring to the attached drawings.

Therefore, the following description relates to a PWM control device of a flyback converter that controls a secondary output voltage by performing averaging/sampling using an auxiliary winding voltage that is formed on the flyback converter.

The following description also relates to a PWM controller of the flyback converter that controls secondary side output current by applying an average current mode method.

In other words, the following description minimizes potential problems with respect to switching noise and controls the flyback converter more accurately by controlling a secondary side output voltage and an output current through using an average current mode method and an output voltage control method by sensing and averaging using an auxiliary winding voltage.

Figure 1:
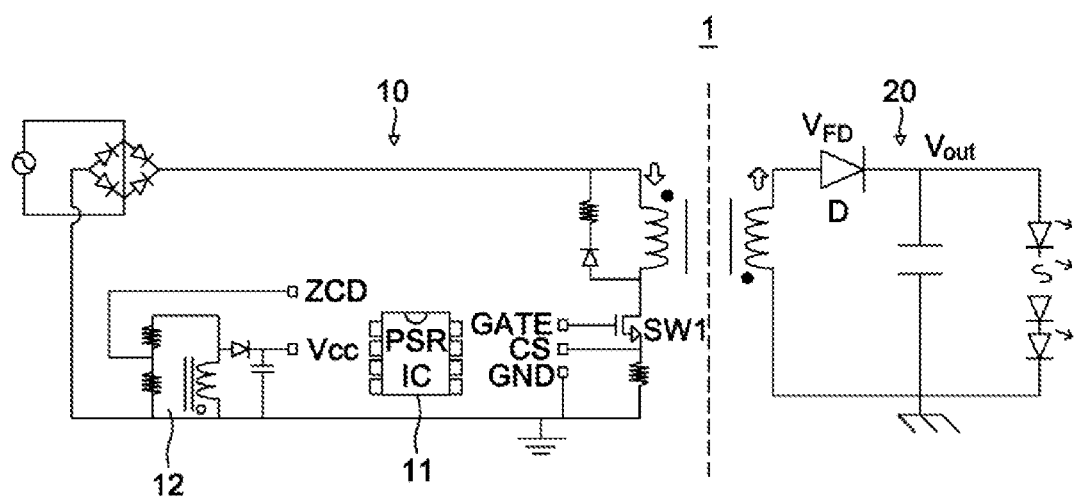
FIG. 1 is a schematic circuit diagram of a flyback converter according to an embodiment.

FIG. 1 is a schematic circuit diagram of a flyback converter according to an embodiment.

A flyback converter 1 drives a first switch SW1 formed on a primary side of the flyback converter 1, thereby charging or discharging energy into a magnetizing inductance, and is able to change a ratio of input to output with a wide range using a turns ratio of a transistor. Further, the first switch SW1 is adjusted through the operation of an internal Integrated Circuit (IC), that is, Primary Side Regulation (PSR) IC 11 and generally, the first switch SW1 uses a power Metal-Oxide-Semiconductor Field Effect Transistor (MOSFET), and a switch that is formed on a secondary side 20 uses a diode, also referred to as a 'second switch,' D. The second switch is automatically turned on when the first switch SW1 is turned off. As a result, the energy stored in the magnetizing inductance is transferred into the secondary side 20.

Auxiliary winding 12 is another element of the flyback converter 1 of FIG. 1.

However, as aforementioned a flyback converter 1 of the embodiment FIG. 1 has a complicated circuit structure due to a structure used to receive a feedback signal. Further, an output voltage and an output current have not been accurately controlled due to an error between an auxiliary winding voltage and the output voltage, and a resonance generated from the auxiliary winding voltage.

Accordingly, a method of obtaining the secondary side information through an auxiliary winding voltage and controlling the secondary side voltage and current at a primary side 10 is required. For this goal, a PWM controller and a control method of a flyback converter are suggested.

Figure 2:
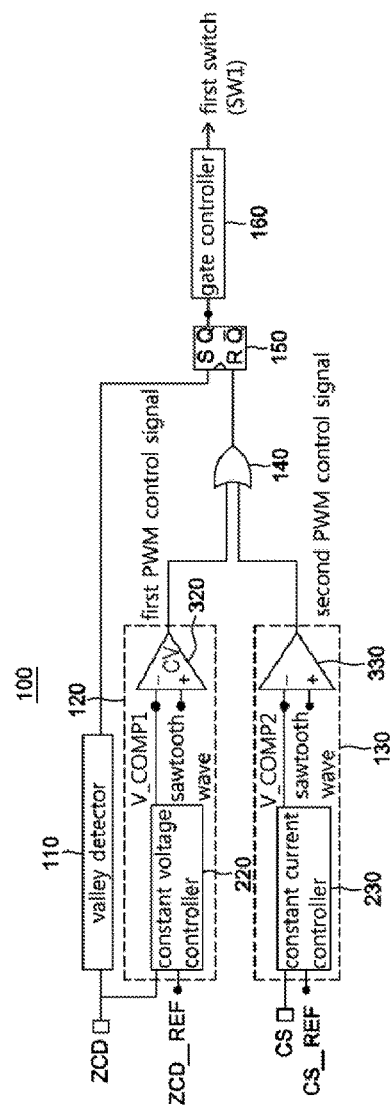
FIG. 2 is a diagram illustrating a PWM control device to drive the flyback converter in a primary side control method according to an embodiment.

FIG. 2 is a diagram illustrating a PWM control device to drive the flyback converter in a primary side control method according to an embodiment.

The PWM controller 100 includes a valley detecting unit or valley detector 110 configured to detect a valley of an auxiliary winding voltage ZCD of a flyback converter 1. The valley of an auxiliary winding voltage ZCD is generated when a current applied on the secondary side diode D assumes a zero value. Thus, the valley detector 110 is configured to detect a time at which the current applied on the secondary side diode D assumes a zero value. When the current applied on the secondary side diode D assumes a zero value, the first switch SW 1 is turned on.

Further, the PWM controller 100 includes a first controller, that is, output voltage controller 120 configured to control the output voltage by using a detection value of the valley detector 110 and a second controller, that is, output current controller 130 to control an output current. The first controller 120 is a block configured to control an output voltage by using an averaging and sampling method of an auxiliary winding voltage ZCD. Additionally, the second controller 130 is a block configured to control an output current using an average current mode method. Either one of the first controller 120 and the second controller 130 may be formed in a variety of different ways, and examples used in certain embodiments are presented below.

The first controller 120 includes a constant voltage controller 220 and a first PWM comparator 320. After the constant controller 220 receives, as input, an auxiliary voltage ZCD and an auxiliary winding reference voltage ZCD_REF, an PWM control voltage V_COMP1 is generated according to a series of process steps. Furthermore, the first PWM comparator 320 outputs a first PWM control signal after comparing the PWM control voltage V_COMP1 and a sawtooth wave generated by an internal IC 11. Here, an inverted terminal (−) of the first PWM comparator 320 is applied to the PWM control voltage V_COMP1, and the internal IC 11 is connected to a non-inverted terminal (+). A sawtooth generator 228, shown in FIG. 3 configured to generate an internal sawtooth wave is also connected along with the internal IC 11. The sawtooth wave is generated while the first switch SW1 is turned-on. Meanwhile, the constant voltage controller 220 uses a constant voltage mode method and the structure of the constant voltage controller 220 is illustrated further subsequently.

The second controller 130 includes a constant current controller 230 and the second PWM comparator 330. The constant controller 230 receives as input a current signal, hereinafter, referred to as a 'CS voltage' of the first switch SW1 and a predetermined CS reference voltage CS_REF and generates a PWM control voltage V_COMP2 according to a series of process steps. Further, after comparison between the PWM control voltage V_COMP2 and the CS voltage, that is, a voltage having a sawtooth form, the second PWM comparator 330 outputs the second PWM control signal according to the comparison result. Here, the constant current controller 230 uses a constant current mode method and the structure of the constant current controller 230 is further illustrated subsequently.

In an embodiment, an OR gate 140 is connected to the output terminals of the first controller 120 and the second controller 130.

The output terminal of the OR gate 140 is connected to a latch unit or latch 150 that receives an output signal of the OR gate 140 and an output value of a valley detector 110. The latch 150 is configured to output a gate on/off signal of the first switch SW1. In an embodiment, the latch 150 is a SR latch circuit and outputs a signal that turns on/off the first switch SW1 in order to provide the PWM duty control.

Further, in this embodiment, a gate controller 160 that receives a gate on/off signal that is an output signal of the latch 150 and controls turning the first switch SW1 on/off is included.

Figure 3:
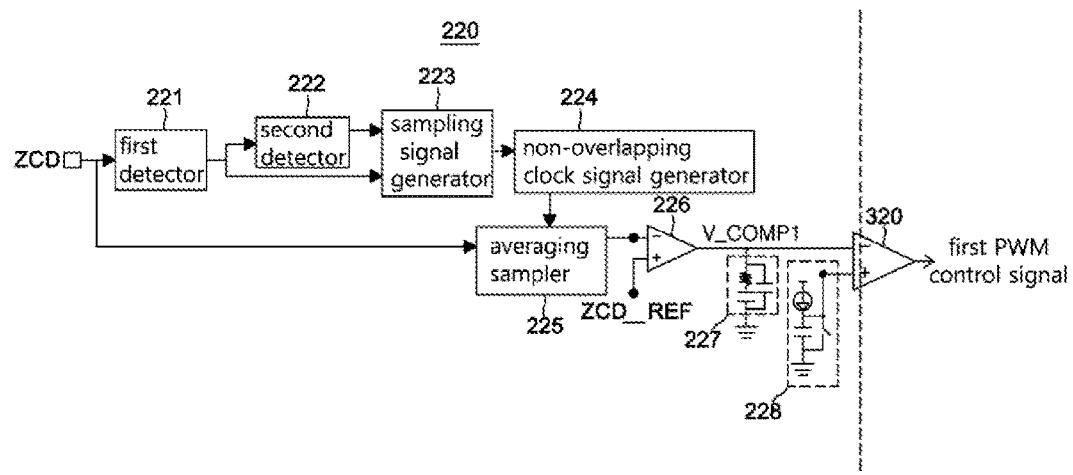
FIG. 3 is a detailed diagram of a constant voltage controller of the embodiment of FIG. 2.

FIG. 3 is a detailed diagram of a constant voltage controller of FIG. 2.

In the embodiment of FIG. 3, a first detector 221 is configured to detect a time at which a current applied on a secondary side diode D assumes a zero value.

The output terminal of the first detector 221 is connected to a second detector 222 that is configured to measure the detection time of the auxiliary winding voltage ZCD. The time is measured from the point in time that the first switch SW1 is turned-off to a point in time at which the auxiliary winding voltage ZCD falls below the valley detecting reference voltage.

A sampling signal generator 223 is connected to the output terminals of the first detector 221 and the second detector 222. The sampling signal generator 223 outputs a signal for sampling at an earlier time than the time detected from the first detector 221 based on the time a signal from the second detector 222 is detected.

Additionally, in the embodiment of FIG. 3, a non-overlapping clock signal generator 224 configured to generate a signal that does not overlap with a sampling signal is connected to the output terminal of the sampling signal generator 223. The non-overlapping clock signal generator 224 is connected to the sampling signal generator 223 in this manner for performing averaging and sampling of the auxiliary wining voltage ZCD.

An averaging sampler 225 is configured to perform averaging on the auxiliary winding voltage ZCD and to perform sampling using a signal that is generated by the non-overlapping clock signal generator 224. The averaging sampler 225 performs averaging and outputs a signal that is sampled on the auxiliary winding voltage ZCD, where the output signal is referred to as ZCD_sample, or 'sampling signal.' In one embodiment, the averaging sample 225 performs averaging using a redistribution scheme of a capacitor based on a non-overlapping clock signal.

A first error amplifier 226 is connected to the output terminal of the averaging sampler 225. The first error amplifier 226 is supplied with a sampled signal through an inverted terminal (−) and an auxiliary winding reference voltage ZCD_REF is supplied to the non-inverted terminal (+). Further, the PWM control voltage V_COMP1 is outputted according to a comparison result of these signals at the first error amplifier 226.

Meanwhile, the output terminal of the first error amplifier 226 is connected to a frequency compensator 227 for frequency compensation regarding an output voltage of the first error amplifier 226. Stable operation of such a system is facilitated through the use of the frequency compensator 227. The frequency compensator 227 includes a first capacitor, a second capacitor and a resistance device.

Further, the output terminal of the first error amplifier 226 is connected to a first PWM comparator 320 that is supplied with an output voltage compensated for frequency to the inverted terminal (−) and a sawtooth wave to the non-inverted terminal (+). The first PWM comparator 320 is illustrated above.

Figure 4:
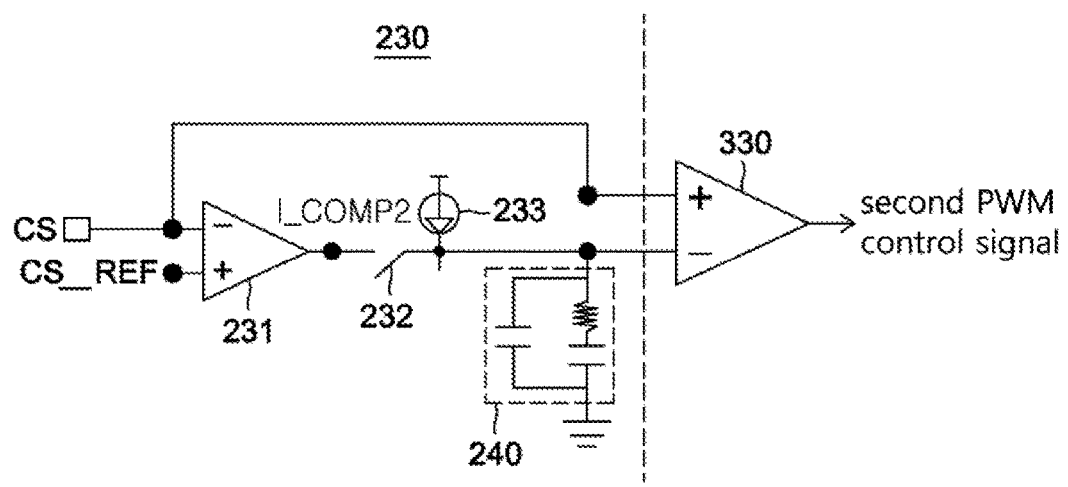
FIG. 4 is a detailed diagram of a constant current controller of the embodiment of FIG. 2.

FIG. 4 is a detailed diagram of a constant current generator of the embodiment of FIG. 2.

A second error amplifier 231 compares the CS voltage that is supplied to the inverted terminal (−) with a reference voltage CS_REF that is supplied to a non-inverted terminal (+).

The output terminal of the second error amplifier 231 is connected to a switch 232 to control an operation timing of the second error amplifier 231. The switch 232 corresponds to a turned-on operation of the first switch SW1, so it is connected while the first switch SW1 is turned-on and connects to a route. As a result, an output voltage based on a comparison result of the CS voltage and a reference voltage CS_REF is supplied to the back terminal.

The pull-up current source 233 is connected to one terminal of the switch 232. The pull-up current source 233 is configured so that the second error amplifier 231 that operates with an average current mode operates in a control operation region. Accordingly, a transconductance, calculated by Gm=Iout/Vin, of the second error amplifier 231 is large enough, given the nature of the pull-up current source 233. Here, transconductance is an expression of the performance of a transistor, which is indicative of the amount of gain or amplification the transistor is capable of delivering, when all other factors are held constant.

Meanwhile, an output voltage of the second error amplifier 231 is applied to an inverted terminal (−) of the second PWM comparator 330 and the CS voltage is applied to a non-inverted terminal (+) of the second PWM comparator 330.

Further, the inverted terminal (−) of the second PWM comparator 330 is connected to the frequency compensator 240. A first capacitor, a second capacitor and a resistance device are included in the frequency compensator 240, similar to how the first PWM comparator 320 is connected to the frequency compensator 227.

Referring to FIG. 2 to FIG. 4, a flyback converter is controlled using a primary side control method by applying a method of performing averaging and sampling on the auxiliary winding voltage, or an average current mode method. Subsequently, the aforementioned methods are illustrated respectively in greater detail.

First, the method of performing averaging and sampling on the auxiliary winding voltage ZCD is illustrated. This discussion also refers to FIG. 5 that is a timing diagram of controlling an output voltage using an averaging/sampling method of a flyback converter according to an embodiment.

Figure 5:
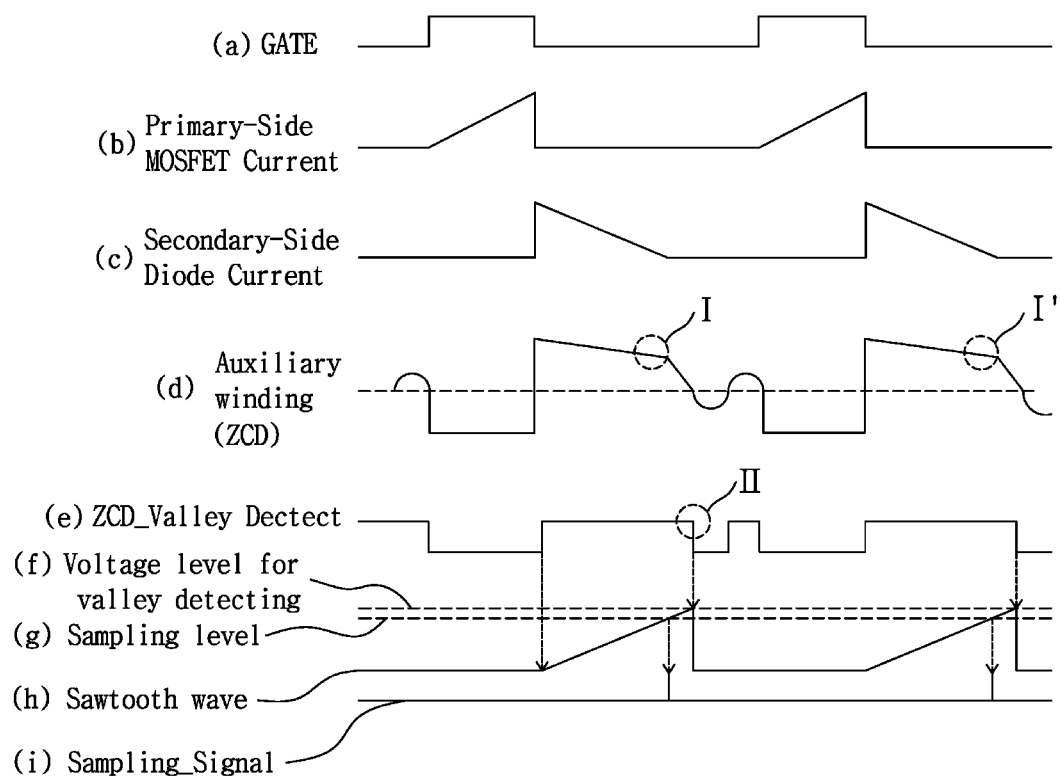
FIG. 5 is a timing diagram of controlling an output voltage using an averaging/sampling method of a flyback converter according to an embodiment.

In FIG. 5, (a) is a gate output signal, (b) is a current wave form of a first switch, (c) is a current wave form applied to a secondary side diode, (d) is an auxiliary winding voltage ZCD wave form, (e) is an output voltage wave form of a valley detecting unit, (f) is an output voltage wave form of a constant voltage controller, (g) is a sampling signal wave form of a faster timing than the valley detecting timing, (h) is a sawtooth wave increasing linearly during a time period when a gate is in a low state, (i) is an output wave form of a sampling signal generator.

For this process, the first switch SW1 operates, and accordingly when a gate output signal (a) assumes a high level, a current value (b) of the first switch increases with a slope proportional to an input voltage and the secondary side diode current (c) maintains a zero level during that time period. Then, when the gate output signal (a) assumes a low level, the current value (b) of the first switch assumes a zero level and the secondary side diode current (c) decreases, with a slope that is proportional to the output voltage, from a peak current value that is proportional to a turn ratio of a transformer.

Further, an auxiliary winding voltage ZCD waveform (d) outputs a voltage proportional to an inverse input voltage Vin at a high level section of a gate output signal, and outputs a voltage sum of an output voltage Vout and a forward bias voltage drop $V_{FD}$ of a secondary side diode at a low level section of a gate output signal. Furthermore, when the secondary side diode current is close to a zero value, the forward bias voltage drop value $V_{FD}$ of a secondary side diode gradually decreases and appears to be close to the output voltage Vout. Then, after the secondary side diode current becomes zero, an inductance of a primary side and a series parasitical inductance part generates a resonance phenomenon. Thus, sampling the auxiliary winding voltage ZCD before the generation of resonance is performed to facilitate proper operation. In the drawing, a region for sampling is indicated as I and I'. In other words, in order to accurately control the output voltage, sampling should be preceded before the I and I' regions are coming.

Accordingly, a first detector 221 generates a wave form (e) to detect the time at which the secondary side diode current (c) become zero, and the second detector 222 generates an output voltage wave form (f) having a predetermined voltage level to measure a timing point (II) when the first valley of an auxiliary winding voltage ZCD is formed. As a result, an output voltage wave form (g) is generated with a voltage level having an earlier time than the first valley time. Then, a sampling signal generator 223 generates a clock signal (i) for comparing the wave form (f) and (g) and sampling the auxiliary winding voltage ZCD. When the clock signal (i) for the sampling is generated, the non-overlapping clock signal generator 224 uses the clock signal (i) and accordingly generates a non-overlapping clock signal.

When the non-overlapping clock signal is generated as aforementioned, an averaging sampler 225 performs averaging and sampling through use of the non-overlapping clock signal. The non-overlapping clock signal refers to a signal that does not overlap with the clock signal (i) that is generated for the sampling.

Thus, noise effects of a sampled voltage are minimized when an auxiliary winding voltage ZCD that is formed on a primary side of a flyback converter is used with an averaging and sampling approach through the aforementioned process. Thus, functional improvement is expected because a possibility of defective operation of a flyback converter is reduced accordingly.

Next, a method of controlling a flyback converter using an average current mode method is illustrated. Hereinafter, such a method illustrates an output current that is controlled with an average current value that corresponding according to a change of a gate duty cycle.

Figure 6:
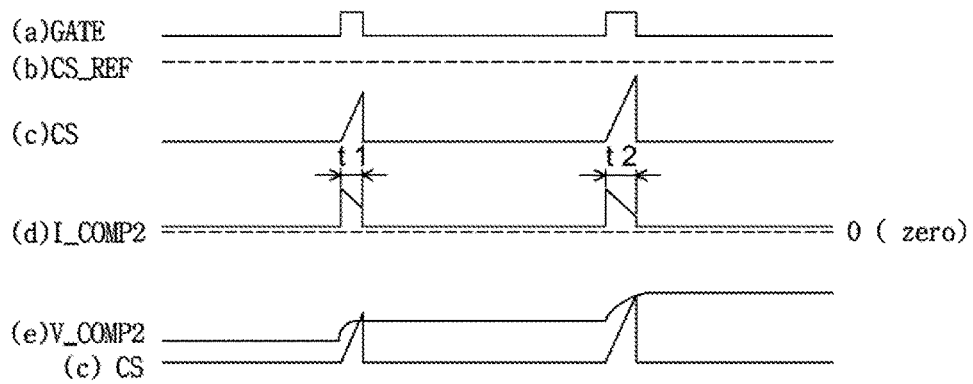

First, a gate duty cycle that gradually increases is illustrated in a timing diagram of FIG. 6.

In FIG. 6, (a) is a gate output signal waveform of a first switch, (b) is a reference voltage level for an average current control of the first switch, (c) is a CS voltage waveform, (d) is an output current I_COMP2 waveform of a second error amplifier, and (e) is an output voltage V_COMP2 waveform of the second error amplifier.

Further, the CS voltage of (c) is formed on a lower region than a reference voltage level (b). The CS voltage shows a linear increase according to I=Vin/L*Ton because a current of a first switch SW is proportional to an input voltage Vin and inversely proportional to an inductance element, having an inductance of L, when a gate output of the first switch SW1 assumes a high level. By contrast, the first switch current assumes a zero value when the gate output of the first switch SW1 takes on a low level.

Further, with reference to an output current I_COMP2 of the second error amplifier 231, when the CS voltage (c) is less than the reference voltage level (b), the output current is generated due to the voltage difference between the reference voltage level and the CS voltage (c). Furthermore, the output current I_COMP2 charges a compensation capacitor formed on a frequency compensator 240 only while a switch 232 performs in a turned-on operation.

Furthermore, the output voltage V_COMP2 of the second error amplifier is output only while the switch 232 performs in a turned-on operation. Here, the output current I_COMP2 charges the compensation capacitor. Accordingly, the output voltage V_COMP2 increases, and when a turned-on time of the switch 232 increases, such that t1<t2, the output voltage V_COMP2 also increases. By contrast, when the switch 232 operates as being turned-off, the second error amplifier 231 does not operate, and hence the voltage level does not change.

FIG. 6 shows that when a gate duty cycle increases, the output voltage also increases and an average current increases accordingly as well.

Figure 7:
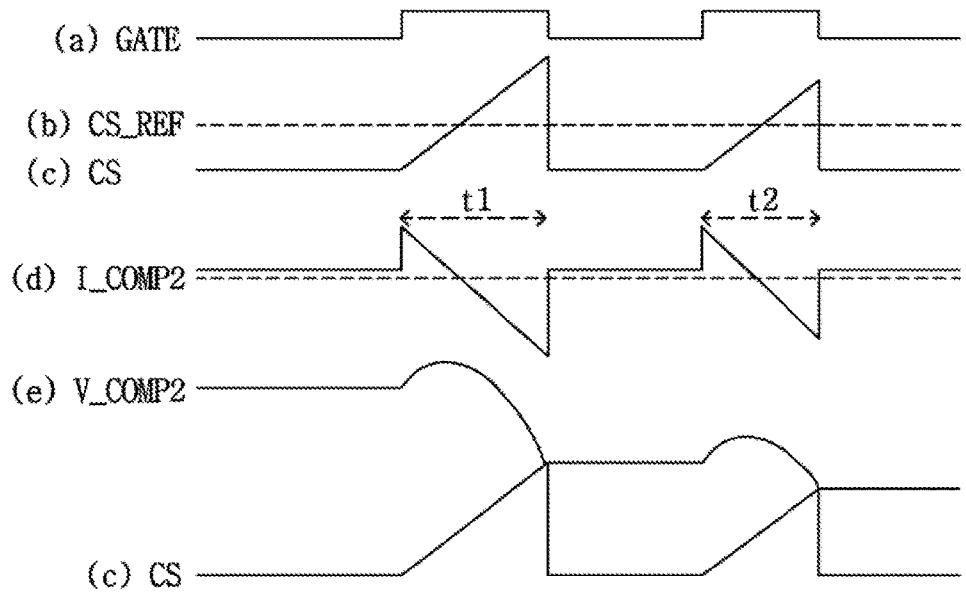

Further, FIG. 7 illustrates a timing diagram of a gate duty cycle decreasing. Signs illustrated in the timing diagram are identical to those presented in the example of FIG. 6.

When a gate output of a first switch SW1 assumes a high level, the first switch current is proportional to an input voltage and is inversely proportional to an inductance element, and hence a CS waveform (c) shows a linear increase according to I=Vin/L*Ton, as discussed above. By contrast, when a gate output of the first switch SW1 assumes a low level, the first switch current becomes zero.

Referring to the output current of the second error amplifier 231 here, when the CS voltage is smaller than the reference voltage during turned-on operation of the switch 232, the output current of the second error amplifier 231 is charged into the compensation capacitor formed on a frequency compensator 240, proportional to the voltage difference. Further, when the CS voltage increases and becomes greater than the reference voltage, the output current is proportional to the voltage difference and the compensation capacitor is discharged. Accordingly, the output current I_COMP2 of the second error amplifier 231 has a longer time for discharging than a time of charging the compensation capacitor, as the turned-on time of a first switch lengthens.

Further, when the output current I_COMP2 of the second error amplifier 231 performs a charging and discharging operation according to an increase of the CS voltage, a waveform (e) of an output voltage V_COMP2 of the second error amplifier 231 increases in a section corresponding to a charging operation and decreases in a section corresponding to a discharging operation. When the first switch SW1 operates at low level, the second error amplifier 231 does not operate, and hence a level of the output voltage V_COMP2 does not change.

As illustrated in FIG. 7, when a gate duty cycle decreases, an output voltage decreases and an average voltage also decreases.

FIG. 8 illustrates a timing diagram of operation with a consistent gate duty cycle.

Referring to the example of FIG. 8, a CS voltage shows a linear increase when the first switch SW1 performs in a turned-on state, and the CS voltage becomes zero when the first switch SW1 performs in a turned-off state.

However, referring to the output current I_COMP2 of the second error amplifier 231, the compensation capacitor is charged in a section in which the CS voltage is less than the reference voltage, whereas the compensation capacitor is discharged in a section in which the CS voltage is larger than the reference voltage. Herein, when the CS voltage average value is the same as the reference voltage, a charging current amount becomes the same as a discharge current amount, that is t1=t2. Hence, in such an embodiment charge/discharge section is symmetrical between the regions as illustrated in FIG. 8.

Referring to the output voltage V_COMP2 of the second error amplifier 231, because the times of charging and discharging are the same, and hence an identical output voltage is formed accordingly.

As aforementioned, when the gate duty cycle is consistent, the output voltage of the second error amplifier 231 is maintained to be consistent as well. Hence the output voltage of the second error amplifier 231 is able to be controlled with an average current value.

An embodiment relates to a flyback converter in which an output voltage and an output current are accurately controlled using a method of performing averaging and sampling on an auxiliary winding voltage and an average current mode method of a CS voltage.

The apparatuses, units, modules, devices, and other components illustrated in FIGS. 1-8 that perform the operations described herein with respect to FIGS. 1-8 are implemented by hardware components. Examples of hardware components include controllers, sensors, generators, drivers, memories, comparators, arithmetic logic units, adders, subtractors, multipliers, dividers, integrators, and any other electronic components known to one of ordinary skill in the art. In one example, the hardware components are implemented by computing hardware, for example, by one or more processors or computers. A processor or computer is implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices known to one of ordinary skill in the art that is capable of responding to and executing instructions in a defined manner to achieve a desired result. In one example, a processor or computer includes, or is connected to, one or more memories storing instructions or software that are executed by the processor or computer. Hardware components implemented by a processor or computer execute instructions or software, such as an operating system (OS) and one or more software applications that run on the OS, to perform the operations described herein with respect to FIGS. 1-8. The hardware components also access, manipulate, process, create, and store data in response to execution of the instructions or software. For simplicity, the singular term "processor" or "computer" may be used in the description of the examples described herein, but in other examples multiple processors or computers are used, or a processor or computer includes multiple processing elements, or multiple types of processing elements, or both. In one example, a hardware component includes multiple processors, and in another example, a hardware component includes a processor and a controller. A hardware component has any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-8 that perform the operations described herein with respect to FIGS. 1-8 are performed by a processor or a computer as described above executing instructions or software to perform the operations described herein.

Instructions or software to control a processor or computer to implement the hardware components and perform the methods as described above are written as computer programs, code segments, instructions or any combination thereof, for individually or collectively instructing or configuring the processor or computer to operate as a machine or special-purpose computer to perform the operations performed by the hardware components and the methods as described above. In one example, the instructions or software include machine code that is directly executed by the processor or computer, such as machine code produced by a compiler. In another example, the instructions or software include higher-level code that is executed by the processor or computer using an interpreter. Programmers of ordinary skill in the art can readily write the instructions or software based on the block diagrams and the flow charts illustrated in the drawings and the corresponding descriptions in the specification, which disclose algorithms for performing the operations performed by the hardware components and the methods as described above.

The instructions or software to control a processor or computer to implement the hardware components and perform the methods as described above, and any associated data, data files, and data structures, are recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any device known to one of ordinary skill in the art that is capable of storing the instructions or software and any associated data, data files, and data structures in a non-transitory manner and providing the instructions or software and any associated data, data files, and data structures to a processor or computer so that the processor or computer can execute the instructions. In one example, the instructions or software and any associated data, data files, and data structures are distributed over network-coupled computer systems so that the instructions and software and any associated data, data files, and data structures are stored, accessed, and executed in a distributed fashion by the processor or computer.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A Pulse-Width Modulation (PWM) controlling apparatus, comprising:
   a valley detector configured to detect a valley of an auxiliary winding voltage of a flyback converter;
   an output voltage controller configured to output a first PWM control signal by performing averaging and sampling of the auxiliary winding voltage;
   an output current controller configured to output a second PWM control signal by performing an average current mode method on a current signal (CS) voltage;
   a latch configured to output a gate control signal in response to being supplied with a result of a logical OR operation of the first PWM control signal output by the output voltage controller and the second PWM control signal output by the output current controller, or being supplied with an output signal of the valley detector; and
   a gate controller configured to perform a turning-on or turning-off operation of a first switch based on the gate control signal.

2. The PWM controlling apparatus of claim 1, wherein the output voltage controller comprises a constant voltage controller configured to generate a first control voltage based on the auxiliary winding voltage and an auxiliary winding reference voltage; and
   a first PWM comparator configured to output the first PWM control signal to determine a first switch gate duty cycle by comparing a generated sawtooth wave, that is generated in an internal Integrated Circuit (IC), with a PWM control voltage.

3. The PWM controlling apparatus of claim 2, wherein the constant voltage controller comprises:
   a first detector configured to detect a time at which a current applied to a secondary side diode of the constant voltage controller becomes zero;
   a second detector, connected to an output terminal of the first detector, configured to detect a time for detecting the auxiliary winding voltage;
   a sampling signal generator configured to generate a signal for sampling at a time that is earlier than the time detected by the first detector based on the time detected by the second detector;
   a non-overlapping clock signal generator configured to generate a clock signal that does not overlap with a sampling signal of the sampling signal generator;
   an averaging sampler configured to perform sampling to produce a sampling signal by averaging the auxiliary winding voltage using the signal generated by the sampling signal generator and the clock signal generated by the non-overlapping clock signal generator; and
   a first error amplifier configured to output the first control voltage by comparing the sampling signal and the auxiliary winding voltage reference value.

4. The PWM controlling apparatus of claim 3, wherein the output terminal of the first error amplifier further comprises a frequency compensator.

5. The PWM controlling apparatus of claim 3, wherein the sampling signal generator is configured to perform sampling of the auxiliary winding voltage before a resonance is generated by the auxiliary winding voltage.

6. The PWM controlling apparatus of claim 1, wherein the output current controller comprises a constant current controller configured to receive the CS voltage and a CS reference voltage and to generate a second control voltage; and
   a second PWM comparator configured to compare the second control voltage and the CS voltage to output a second PWM control signal.

7. The PWM controlling apparatus of claim 6, wherein the constant current controller comprises a second error amplifier configured to compare the CS voltage and the CS reference voltage;
   a second switch configured to operate in accordance with a switching of the first switch and to determine a route for transferring the output current of the second error amplifier; and
   a pull-up current source that is connected to a first side of the second switch.

8. The PWM controlling apparatus of claim 7, wherein the second PWM comparator comprises:
   a first terminal that is supplied with the CS voltage; and
   a second terminal that is supplied with an output voltage of the constant current controller.

9. The PWM controlling apparatus of claim 8, wherein the second terminal of the second PWM comparator is further connected with the frequency compensator configured to compensate for an output current of the second error amplifier, and
   the frequency compensator comprises a compensation capacitor configured to charge and discharge based on an output current of the second error amplifier.

10. The PWM controlling apparatus of claim 9, wherein in response to the CS voltage being smaller than the CS reference voltage, the compensation capacitor is charged while the first switch is turned-on.

11. The PWM controlling apparatus of claim 9, wherein in response to the CS voltage being larger than the CS reference voltage, the compensation capacitor is discharged while the first switch is turned-on.

12. The PWM controlling apparatus of claim 9, wherein a discharging time becomes longer than a charging time in response to a turning-on time of a first switch lengthening.

13. The PWM controlling apparatus of claim 7, wherein in response to a gate duty of the first switch becoming larger, an average current of the second error amplifier increases.

14. The PWM controlling apparatus of claim 7, wherein in response to a gate duty of the first switch becoming smaller, an average current of the second error amplifier decreases.

15. The PWM controlling apparatus of claim 7, wherein in response to a gate duty of the first switch being consistent, an output voltage of the constant current controller is consistent and the PWM controlling apparatus operates in an average current mode.

16. A Pulse-Width Modulation (PWM) controlling apparatus, comprising:
   an output voltage controller configured to output a first PWM control signal by performing averaging and sampling of an auxiliary winding voltage of a flyback converter;

an output current controller configured to output a second PWM control signal by performing an average current mode method on a current signal (CS) voltage; and a gate controller configured to perform a turning-on or turning-off operation of a first switch based on the first PWM control signal, the second PWM control signal, and a valley of the auxiliary winding voltage of the flyback converter.

17. The PWM controlling apparatus of claim 16, further comprising a valley detector configured to detect a valley of the auxiliary winding voltage of the flyback converter.

18. The PWM controlling apparatus of claim 17, wherein the gate controller is configured to perform the turning-on or turning-off operation of the first switch based on a gate control signal output by a latch configured to output the gate control signal in response to being supplied with a result of a logical OR operation of the first PWM control signal output by the output voltage controller and the second PWM control signal output by the output current controller, or being supplied with an output signal of the valley detector.

19. The PWM controlling apparatus of claim 16, wherein the output voltage controller comprises a constant voltage controller configured to generate a first control voltage based on the auxiliary winding voltage and an auxiliary winding reference voltage; and a first PWM comparator configured to output the first PWM control signal to determine a first switch gate duty cycle by comparing a generated sawtooth wave, that is generated in an internal Integrated Circuit (IC), with a PWM control voltage.

20. The PWM controlling apparatus of claim 16, wherein the output current controller comprises a constant current controller configured to receive a CS voltage and a CS reference voltage and to generate a second control voltage; and a second PWM comparator configured to compare a second PWM control voltage and the CS voltage to output a second PWM control signal.

\* \* \* \* \*